United States Patent
Lee (10) Patent No.: US 9,853,464 B2
(45) Date of Patent: Dec. 26, 2017

(54) ENERGY STORAGE SYSTEM AND SYNCHRONIZATION METHOD THEREOF

(71) Applicant: LSIS CO., LTD., Anyang-si, Gyeonggi-do (KR)

(72) Inventor: Seong Joon Lee, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 242 days.

(21) Appl. No.: 14/928,933

(22) Filed: Oct. 30, 2015

(65) Prior Publication Data

US 2016/0254667 A1    Sep. 1, 2016

(30) Foreign Application Priority Data

Feb. 26, 2015  (KR) .................. 10-2015-0027371

(51) Int. Cl.
*H02J 3/14* (2006.01)
*H02J 7/00* (2006.01)
*H02J 13/00* (2006.01)

(52) U.S. Cl.
CPC ......... *H02J 7/0022* (2013.01); *H02J 13/0003* (2013.01)

(58) Field of Classification Search
CPC  H02J 3/00; H02J 3/14; Y02B 70/3225; Y04S 20/222; H01R 25/003; G06F 1/266
USPC ........................................................... 307/39
See application file for complete search history.

(56) References Cited

U.S. PATENT DOCUMENTS

| 2011/0273023 A1* | 11/2011 | Nishida ............... H01M 10/425 307/77 |
| 2012/0268069 A1* | 10/2012 | Park ................... H01M 10/4207 320/116 |
| 2014/0050232 A1* | 2/2014 | Hirose .................. H04J 3/0667 370/503 |
| 2014/0233372 A1* | 8/2014 | Edmiston .......... H04L 12/40019 370/225 |
| 2014/0365792 A1* | 12/2014 | Yun ....................... G06F 1/3212 713/320 |
| 2015/0048779 A1* | 2/2015 | Lee ....................... H02J 7/0003 320/106 |

(Continued)

FOREIGN PATENT DOCUMENTS

| JP | 2010273530 | 12/2010 |
| JP | 2011-211673 | 10/2011 |
| JP | 2013-048477 | 3/2013 |

(Continued)

OTHER PUBLICATIONS

Japan Patent Office Application No. 2015-232843, Office Action dated Dec. 20, 2016, 2 pages.

(Continued)

*Primary Examiner* — Quan Tra
(74) *Attorney, Agent, or Firm* — Lee, Hong, Degerman, Kang & Waimey (57) ABSTRACT

An energy storage system includes: a plurality of slave power controllers connected to respective battery modules; and a master power controller configured to transmit a first signal to the plurality of slave power controllers and transmit a second signal for controlling synchronizations of the plurality of slave power controllers to the plurality of salve power controllers according to a reception time at which each of the plurality of salve power controllers receives the first signal.

11 Claims, 6 Drawing Sheets

(56) References Cited

U.S. PATENT DOCUMENTS

2016/0095078 A1* 3/2016 Yamada ............... H04L 12/437
                                                        370/242

FOREIGN PATENT DOCUMENTS

| JP | 2013-118743 | 6/2013 |
| JP | 2014-519752 | 8/2014 |
| KR | 10-2010-0124499 | 11/2010 |
| KR | 10-2014-0049287 | 4/2014 |
| WO | 2008129593 | 10/2008 |

OTHER PUBLICATIONS

Korean Intellectual Property Office Application Serial No. 10-2015-0027371, Office Action dated May 30, 2016, 6 pages.

* cited by examiner

ENERGY STORAGE SYSTEM AND SYNCHRONIZATION METHOD THEREOF

CROSS-REFERNCE TO RELATED APPLICATIONS

Pursuant to 35 U.S.C. §119(a), this application claims the benefit of earlier filing date and right of priority to Korean Patent Application No. 10-2015-0027371, filed on Feb. 26, 2015, the contents of which are all hereby incorporated by reference herein in its entirety.

BACKGROUND

The present disclosure relates to an energy storage system and a synchronization method thereof, and particularly, to an energy storage system for synchronizing a control time between a plurality of slave power controller and a synchronization method thereof.

With the development of industry, the power demand is increased and as a load gap between day and night and a power usage gap between seasons and holidays are increased gradually, the decline of a load factor is intensified.

Recently, for this reason, various load management techniques for reducing a peak load by using surplus electric power are developed and representative one among such techniques is a battery energy storage system.

The battery energy storage system stores surplus electric power at night or surplus electric power generated from wind power and solar light and supplies electric power to a load by discharging the stored electric power during a peak load or a system fault. Through this, it is possible to achieve the maximum load reduction and load leveling. Recently, an emerging smart grid due to the emergence of various new and renewable energy sources may be used for such a battery energy storage system.

On the other hand, an energy storage system may include at least one power controller for controlling discharging or charging energy stored in each load. The power controller may be provided in plurality.

The power controller may include a plurality of slave power controller and one master power controller for controlling operations of each slave power controller.

As a communication method between the master power controller and the plurality of slave power controller, a ring network may be used and a control command transmitted from the master power controller may be sequentially transmitted to the plurality of slave power controller.

In relation to the plurality of slave power controller connected via a ring network, times for receiving control commands transmitted from the master power controller may vary and a time delay may occur in at least one slave power controller.

SUMMARY

Embodiments resolve the above-mentioned issues and other issues.

Embodiments also synchronize a control time between a plurality of power controller connected via a ring network.

In one embodiment, an energy storage system includes: a plurality of slave power controllers connected to respective battery modules; and a master power controller configured to transmit a first signal to the plurality of slave power controllers and transmit a second signal for controlling synchronizations of the plurality of slave power controllers to the plurality of salve power controllers according to a reception time at which each of the plurality of salve power controllers receives the first signal.

The master power controller may transmit the first signal to one of the plurality of slave power controllers and the plurality of slave power controllers transmit the first signal sequentially and measure the reception time.

Another one of the plurality of slave power controllers may transmit the reception time of each of the plurality of salve power controllers to the master power controller.

The master power controller and the plurality of salve power controllers may be connected to a ring network; the master power controller may transmit the first signal to one of the plurality of master power controllers; and the plurality of slave power controllers sequentially may transmit the first signal according to the ring network.

The plurality of slave power controllers may measure the reception time and deliver the reception time sequentially according to the ring network.

Another one of the plurality of slave power controllers may transmit the reception time of each of the plurality of slave power controllers to the master power controller.

The master power controller may transmit the second signal to one of the plurality of slave power controllers on the basis of a reception time of each of the plurality of slave power controllers.

The master power controller and the plurality of slave power controllers may be connected to a ring network and the plurality of salve power controllers sequentially may transmit the second signal according to the ring network.

The second signal may include synchronization data for synchronizing the plurality of slave power controllers.

The second signal may further include control data for controlling each of the plurality of slave power controllers.

The plurality of slave power controllers simultaneously may control all batteries connected to the plurality of slave power controllers in response to the second signal.

Types of the first signal and the second signal may be different from each other.

The first signal may be a test signal and the second signal may include synchronization data for synchronizing the plurality of slave power controllers and control data for controlling each of the plurality of slave power controllers.

In another embodiment, an energy storage system synchronizing method includes: when a first signal is received by a plurality of slave power controllers, measuring a reception time at which each of the plurality of slave power controllers receives the first signal; and receiving, by the plurality of salve power controllers, a second signal for controlling synchronizations of the plurality of slave power controllers on the basis of the reception time.

The measuring of the reception time may include: when a master power controller transmits the first signal, receiving the first signal by one of the plurality of slave power controllers; and sequentially transmitting the first signal received by one of the plurality of slave power controllers, by the plurality of slave power controllers.

The plurality of slave power controllers may be connected to a ring network and the first signal received by one of the plurality of salve power controllers may be sequentially delivered to the plurality of salve power controllers according to the ring network.

The measuring of the reception time may include measuring a reception time at which each of the plurality of slave power controllers receives the first signal.

The second signal may include synchronization data for synchronizing the plurality of slave power controllers.

The second signal may further include control data for controlling the plurality of salve power controllers.

The method may further include simultaneously controlling, by the plurality of slave power controllers, all battery modules connected to the plurality of slave power controllers in response to the second signal.

The details of one or more embodiments are set forth in the accompanying drawings and the description below. Other features will be apparent from the description and drawings, and from the claims.

DETAILED DESCRIPTION OF THE EMBODIMENTS

Hereinafter, specific embodiments of the present invention are described in more detail with reference to the accompanying drawings. However, the invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

In the following description, detailed descriptions of well-known functions or constructions will be omitted since they would obscure the invention in unnecessary detail. Additionally, numbers (for example, first and second) used in the description of this specification are just identification symbols for distinguishing one component from another component.

Terms used in the present invention are terms that are currently and widely used, if possible but in a specific case, there may be arbitrarily selected terms and in this case, since their meanings are explained in detail in the detailed description part, the present invention should be understood with the meaning of a term instead of the naming of the term.

When one element is referred to as being 'connected' or 'coupled' to another element, it should be understood that the former may be directly connected or coupled to the latter, but connected or coupled to the latter via an intervening element. On the contrary, when one element is referred to as being 'directly connected' or 'directly coupled' to another element, it should be understood that the former is connected to the latter without an intervening element therebetween.

The meaning of "include," "comprise," "including," or "comprising," specifies a property, a region, a fixed number, a step, a process, an element and/or a component but does not exclude other properties, regions, fixed numbers, steps, processes, elements and/or components.

Hereinafter, embodiments of the present invention are described in more detail with reference to the accompanying drawings. Like reference numerals refer to like elements regardless of drawing numbers in order to facilitate a thorough understanding.

Hereinafter, an energy storage system and an energy storing method will be described with reference to FIGS. 1 to 3 according to an embodiment of the present invention.

Hereinafter, a configuration of an energy storage system will be described with reference to FIG. 1. FIG. 1 is a block diagram illustrating a configuration of an energy storage system according to an embodiment of the present invention.

Figure 1:
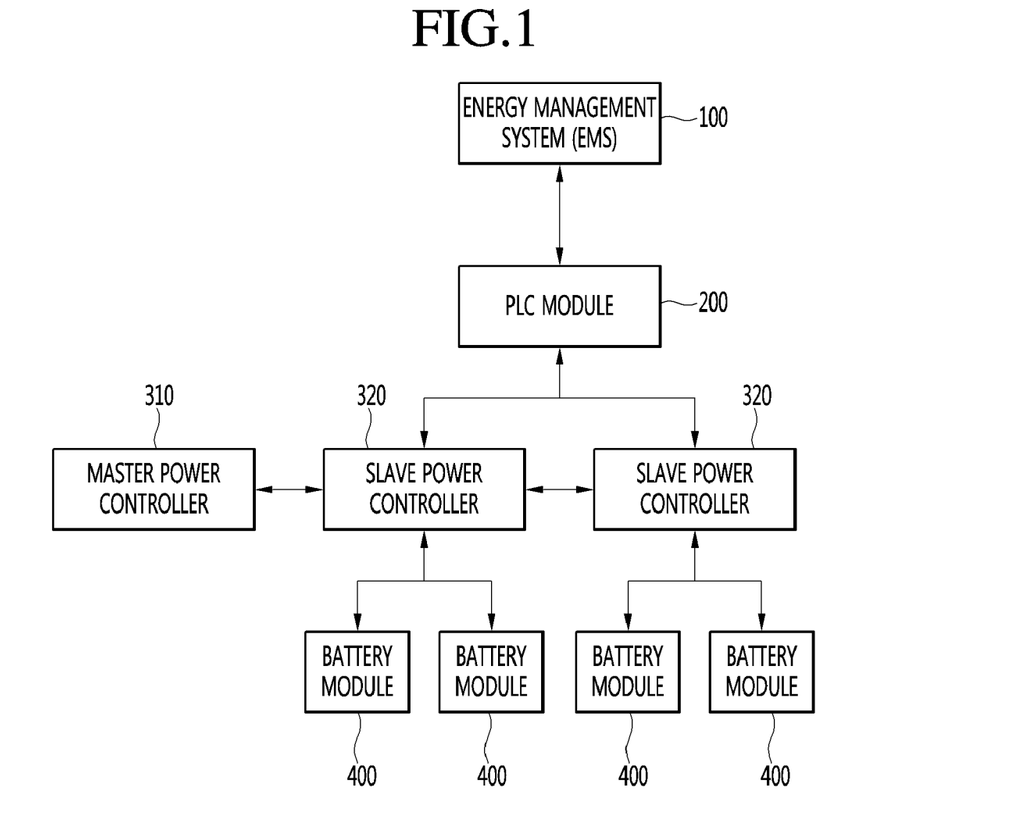
FIG. 1 is a block diagram illustrating a configuration of an energy storage system according to an embodiment of the present invention.

As shown in FIG. 1, the energy storage system may include an Energy Management System (EMS) 100, a Programmable Logic Control (PLC) module 200, a plurality of power controller 310 and 320, and a plurality of battery modules 400.

The EMS 100 may receive a specific control command from an upper level system (not shown) connected to the energy storage system.

When receiving the specific control command, the EMS 100 may generate a control command that is to be transmitted to a low level system (for example, a PLC module, a power controller, and a battery module) preset as a management target of the EMS 100.

Once a control command to be delivered to a low level system (for example, a PLC module, a power controller, and a battery module), the EMS 100 may transmit a specific control command to the PLC module 200 and this will be described below.

The PLC module 200 may receive a specific control command from the EMS 100.

The PLC module 200 may receive a specific control command and generate a control command that is to be transmitted to each of the plurality of power controller 310 and 320, which is preset to be managed by the PLC module 200, on the basis of the specific control command.

When a control command to be transmitted to the plurality of preset power controller 310 and 320 is generated, the PLC module 200 may transmit the generated control command to the plurality of power controllers 310 and 320.

One PCL module 200 may control at least two power controllers and receive state information of a low level system (for example, battery charging rate information) from at least two power controllers.

The power controllers 310 and 320 may use the PLC module 200 as a controlling component and the PLC module 200 may process an operation for changing a complex sequence occurring in an energy storage system into a system program to allow a user (or an operator) to use it easily. The PLC module 200 may efficiently process a complex sequence according to each situation of a large-capacity energy storage system.

Additionally, as one PLC module 200 controls at least two power controllers, this has the effect of cost reduction.

Additionally, the PLC module 200 may separately remove and replace only a component where an error occurs, and accordingly, a more stable and efficient operation is possible.

Additionally, the Master-k program may be installed as one example of the PLC module 200 and a user may operate the PLC module 200 while the Master-k program is installed.

The plurality of power controllers 310 and 320 may receive state information of each battery module 400 from each of a plurality of battery modules 400 in a low level system.

As an example of state information of each battery module, charging state information of a battery included in each battery module may be included and an embodiment of the present invention is not limited thereto and this will be described later.

When receiving state information of each battery module 400 from each of the plurality of battery modules 400 in a low level system, each of the power controllers 310 and 320 may transmit the received state information of each battery module 400 to the PLC module 200.

Additionally, each of the power controllers 310 and 320 may receive each control command from the PLC module 200 in an upper level system.

When receiving each control command from the PLC module 200 in an upper level system, each of the power controllers 310 and 320 may generate a plurality of respective control commands to be transmitted to the plurality of battery modules 400 in a lower level system.

On the basis of each control command received from the PLC module 200 in an upper level system, each of the power controllers 310 and 320 may transmit a plurality of respective control commands to be transmitted to the plurality of battery modules 400.

The plurality of power controllers 310 and 320 may be connected via a linear network or a ring network. The plurality of power controllers 310 and 320 may include a master power controller 310 and a plurality of slave power controllers 320 controlled by the master power controller 310.

Each of the plurality of battery modules 400 may include a battery (not shown).

Each of a plurality of battery modules may generate state information of a battery included in each of the plurality of battery modules.

If state information of a battery is generated, each of the plurality of battery modules may transmit the generated state information of each battery to each of the power controllers 310 and 320 in an upper level system.

The battery state information may include charging rate information of each battery and cell information of each battery and an embodiment of the present invention is not limited thereto.

Hereinafter, referring to FIGS. 2 and 3, a power controller synchronizing method is described according to an embodiment of the present invention.

Figure 2:
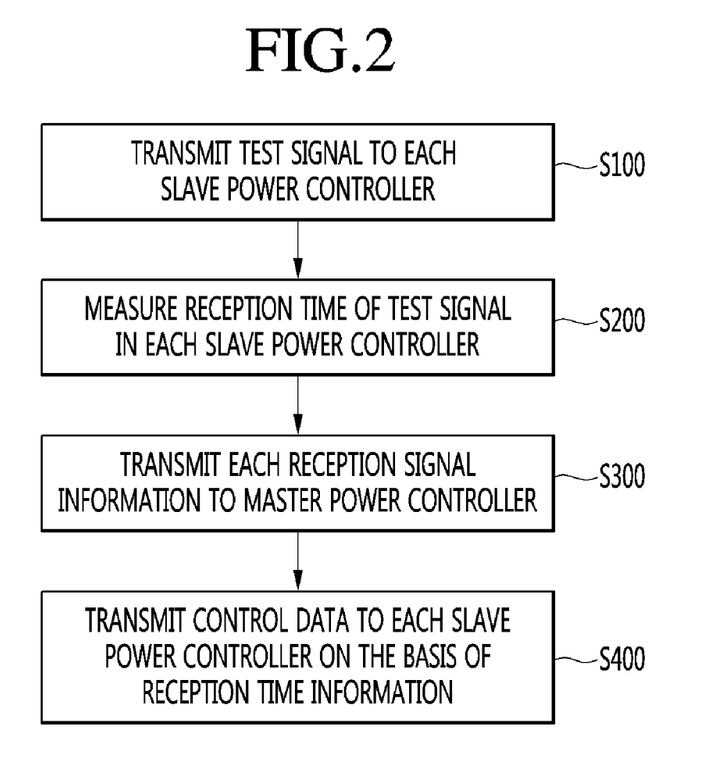
FIG. 2 is a block diagram illustrating a master and slave power controller according to an embodiment of the present invention.

FIG. 2 is a block diagram illustrating a master power controller and a slave power controller according to an embodiment of the present invention. FIG. 3 is a flowchart illustrating a power controller synchronizing method according to an embodiment of the present invention.

An energy storage system may include a plurality of slave power controllers 321, 322, 323, and 324 respectively connected to battery modules. The plurality of slave power controllers 321, 322, 323, and 324 shown in FIG. 2 have the same configuration as the slave power controller 320 shown in FIG. 1 and for convenience of description, the plurality of slave power controllers 321, 322, 323, and 324 are used.

Then, an energy storage system may include a master power controller 310 for transmitting a first signal to the plurality of slave power controllers 321, 322, 323, and 324. The master power controller 310 may transmit, to the plurality of slave power controllers 321, 322, 323, and 324, a second signal for controlling the synchronization of the plurality of slave power controllers 321, 322, 323, and 324 according to a reception time at which each of the plurality of slave power controllers 321, 322, 323, and 324 receives the first signal.

The master power controller 310 may be communicably connected to the plurality of slave power controllers 321, 322, 323, and 324. The master power controller 310 may be communicably connected to the plurality of slave power controllers 321, 322, 323, and 324 via a ring network.

Each of the plurality of slave power controllers 321, 322, 323, and 324 may be connected to the battery module 400. In relation to a slave power controller, one battery module may be connected to one slave power controller and a plurality of battery modules may be connected to one slave power controller.

The master power controller 310 may transmit a first signal to one of the plurality of slave power controllers 321, 322, 323, and 324. The first signal may be a test signal. The first signal may be a signal for transmitted from the master power controller 310 to measure a time at which each of the plurality of slave power controllers 321, 322, 323, and 324 receives the first signal. On the other hand, the first signal is not limited to a test signal and may be configured with a control signal transmitted to the plurality of slave power controllers 321, 322, 323, and 324 in order to allow the master power controller 310 to control each of the plurality of slave power controllers 321, 322, 323, and 324.

The plurality of slave power controllers 321, 322, 323, and 324 may transmit first signals sequentially and measure each reception time at which a first signal is received. The first signal may be a signal having a specific waveform and each of the plurality of slave power controllers 321, 322, 323, and 324 may receive and transmit the first signal. The plurality of slave power controllers 321, 322, 323, and 324 may sequentially transmit first signals according to a ring network. The plurality of slave power controllers 321, 322, 323, and 324 may sequentially deliver measured reception times. The plurality of slave power controllers 321, 322, 323, and 324 may sequentially deliver a reception time measured by each of the plurality of slave power controllers 321, 322, 323, and 324 according to a ring network.

Another one among the plurality of slave power controllers 321, 322, 323, and 324 may transmit a reception time of each of the plurality of slave power controllers 321, 322, 323, and 324 to the master power controller 310.

The master power controller 310 may transmit, to one of the plurality of slave power controllers 321, 322, 323, and 324, a second signal for controlling the synchronization of the plurality of slave power controllers 321, 322, 323, and 324 on the basis of the reception time of each of the plurality of slave power controllers 321, 322, 323, and 324.

The second signal may be identical to the first signal, a similar type of the first signal, or a different type of the first signal.

The second signal may include synchronization data for synchronizing the plurality of slave power controllers 321, 322, 323, and 324. Herein, the synchronization data may include a first control command relating to a control time for controlling the synchronization of the plurality of slave power controllers 321, 322, 323, and 324. Then, the second signal may further include control data for controlling each of the plurality of slave power controllers 321, 322, 323, and 324. The control data may include a second control command for separately controlling the plurality of slave power controllers 321, 322, 323, and 324.

The plurality of slave power controllers 321, 322, 323, and 324 may sequentially transmit second signals according to a ring network.

The plurality of slave power controllers 321, 322, 323, and 324 may simultaneously control all battery modules 400 connected to the plurality of slave power controllers 321, 322, 323, and 324 in response to the second signal.

Hereinafter, for convenience of description, a case that four slave power controllers are connected in series is described as an example. It is apparent that the present invention is not limited to the number of salve power controllers and is applied to all cases that there are two or more slave power controllers.

As shown in FIG. 2, one master power controller 310, the first slave power controller 321, the second slave power controller 322, the third slave power controller 323, and the fourth slave power controller 324 may transmit and receive test signals 11, 12, 13, and 14 mutually through communication via a ring network.

Figure 3:
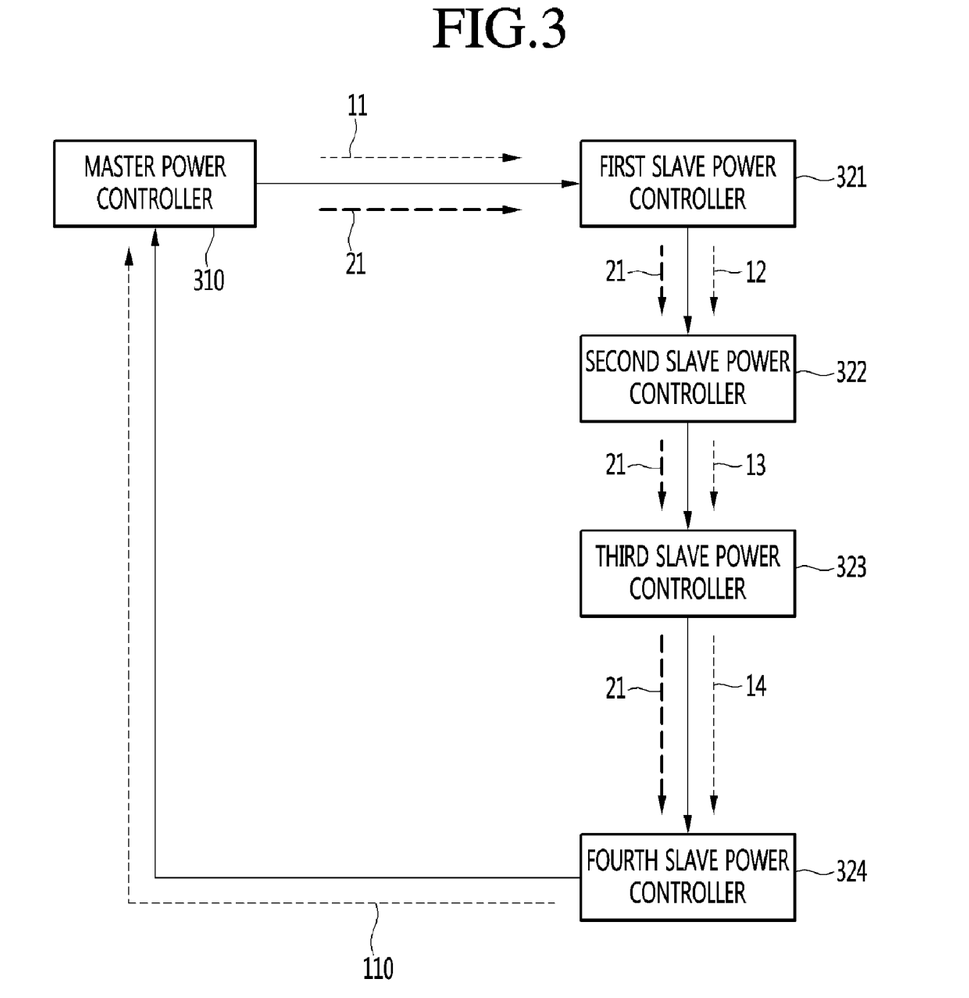
FIG. 3 is a flowchart illustrating a power controller synchronizing method according to an embodiment of the present invention.

Referring to FIGS. 2 and 3, the master power controller 310 may transmit a first signal to one of the plurality of slave power controllers 321, 322, 323, and 324 and transmit a first signal having a specific waveform to the first slave power controller 321 in operation S100

When the master power controller 310 transmits a first signal 11, the first signal 11 may be received by one of the plurality of slave power controllers 321, 322, 323, and 324 and the received first signal 11 may be sequentially transmitted by the plurality of slave power controllers 321, 322, 323, and 324. The first signal 11 received by one of he plurality of slave power controllers 321, 322, 323, and 324 may sequentially delivered to the plurality of slave power controllers 321, 322, 323, and 324 according to a ring network.

Referring to FIGS. 2 and 3, the first signal 11 transmitted from the master power controller 310 is sequentially received by the plurality of slave power controllers 321, 322, 323, and 324 and each of the plurality of slave power controllers 321, 322, 323, and 324 measures a reception time at which the first signal 11 is received by each one in operation S200.

In relation to test signals 11, 12, 13, and 14 transmitted to each of the plurality of slave power controllers 321, 322, 323, and 324, there may be a difference in reception time for each slave power controller due to a communication delay between the master power controller 310 and each of the plurality of slave power controllers 321, 322, 323, and 324.

Hereinafter, for convenience of description, a first signal transmitted from the master power controller 310 to the first salve power controller 321 is referred to as a first test signal 11; a first signal transmitted from the first salve power controller 321 to the second salve power controller 322 is referred to as a second test signal 12; a first signal transmitted from the second salve power controller 322 to the third slave power controller 323 is referred to as a third test signal 13; and a first signal transmitted from the third salve power controller 323 to the fourth slave power controller 324 is referred to as a third test signal 14.

Referring to FIG. 2, the first test signal 11 transmitted from the master power controller 310 may be received by the first slave power controller 321 and the first slave power controller 321 may transmit the second test signal 12 to the second slave power controller 322. When the second test signal 12 is received by the second slave power controller 322, the second slave power controller 322 may transmit the third test signal 13 to the third slave power controller 323. When the third test signal 13 is received by the third slave power controller 323, the third slave power controller 323 may transmit the fourth test signal 14 to the fourth slave power controller 323.

The reception signal of the first signal may be different for each of the plurality of slave power controllers 321, 322, 323, and 324 by a communication line between the first slave power controller 321 and the second slave power controller 322, a communication line between the second slave power controller 322 and the third slave power controller 323, and a communication line between the third slave power controller 323 and the fourth slave power controller 324.

Referring to FIGS. 2 and 3, when the reception times of the first signals (11, 12, 13, and 14) are measured by each of the plurality of slave power controllers 321, 322, 323, and 324, another one of the plurality of slave power controllers 321, 322, 323, and 324 may transmit the reception time 110 in each of the plurality of slave power controllers 321, 322, 323, and 324 to the master power controller 310 in operation S300. The fourth slave power controller 324 among the plurality of slave power controllers 321, 322, 323, and 324 may transmit, to the master power controller 310, the reception times 110 at which the plurality of slave power controllers 321, 322, 323, and 324 receive the respective first signals 11, 12, 13, and 14 in operation S300. That is, the fourth slave power controller 324 may transmit, to the master power controller 310, each of a reception time at which the first test signal 11 is received by the first slave power controller 321, a reception time at which the second test signal 12 is received by the second slave power controller 322, a reception time at which the third test signal 13 is received by the third slave power controller 323, and a reception time at which the fourth test signal 14 is received by the fourth slave power controller 324.

In relation to the plurality of slave power controllers 321, 322, 323, and 324, the first slave power controller 321 that receives a first signal first from the master power controller 310 may be different from the fourth slave power controller 324 that transmits the reception time 110 of each of the plurality of slave power controllers 321, 322, 323, and 324 to the master power controller 310.

As shown in FIG. 2, the first slave power controller 321 may receive a first signal first from the master power controller 324 and the fourth salve power controller 324 may transmit the reception time 110 of each slave power controller to the master power controller 310. The first slave power controller 321 may be a first slave power controller on a ring network among a plurality of slave power controllers and the fourth slave power controller 324 may be the last slave power controller on a ring network among a plurality of slave power controllers. On the other hand, a slave power controller that transmits the reception time of each slave power controller to the master power controller 310 is not limited to the fourth slave power controller 324 and may be configured with one of a plurality of slave power controllers.

Referring to FIGS. 2 and 3, when receiving the reception time 110 in each of the plurality of slave power controllers 321, 322, 323, and 324, the master power controller 310 may transmit a second signal for synchronizing the plurality of slave power controllers 321, 322, 323, and 324 on the basis of the received reception time information and the second signal may be received by the plurality of slave power controllers 321, 322, 323, and 324 in operation S400.

The second signal may include synchronization data for synchronizing the plurality of slave power controllers 321, 322, 323, and 324. Then, the second signal may further include control data for controlling the plurality of slave power controllers 321, 322, 323, and 324.

The plurality of slave power controllers 321, 322, 323, and 324 may simultaneously control all battery modules connected to the plurality of slave power controllers 321, 322, 323, and 324 in response to the second signal. The plurality of slave power controllers 321, 322, 323, and 324 may execute a control command in the second signal in consideration of a control timing in the second signal.

Hereinafter, referring to FIGS. 4 and 5, a reception time measurement and a method of transmitting synchronization data and control data are described in more detail according to an embodiment of the present invention.

Hereinafter, referring to FIG. 4, the reception time measurement of a test signal is described in more detail according to an embodiment of the present invention.

Figure 4:
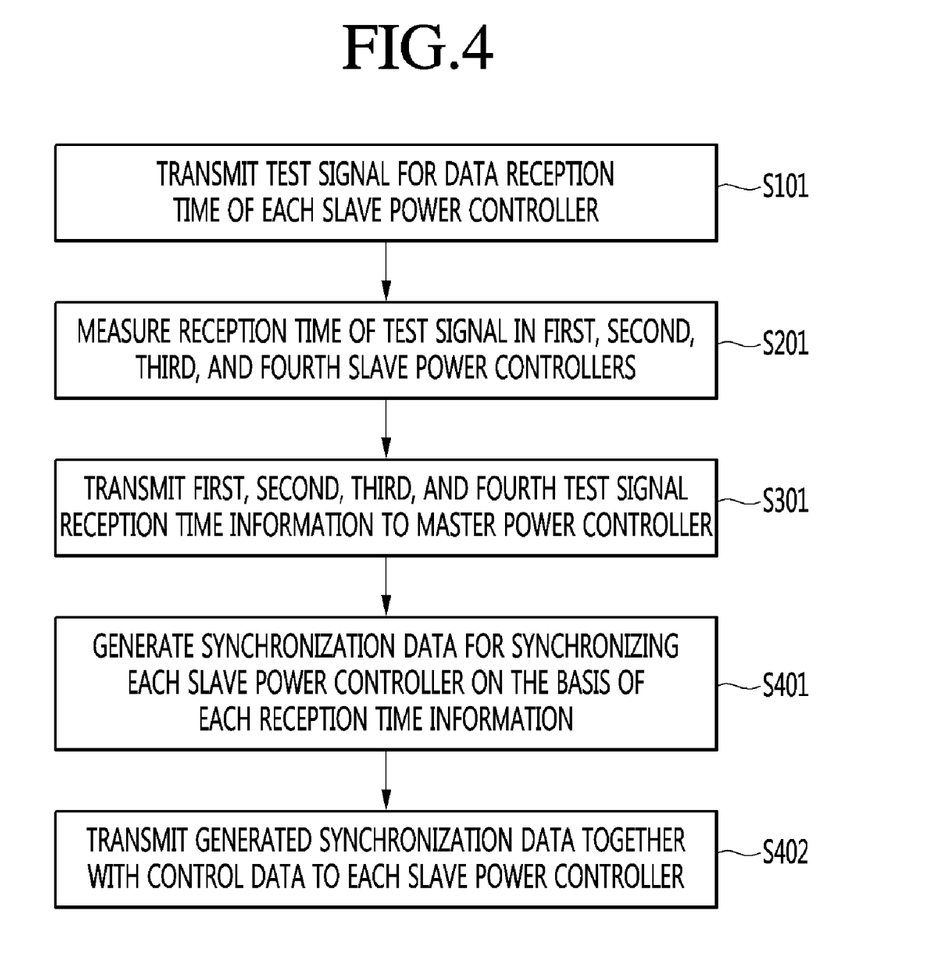
FIG. 4 is a block diagram illustrating a process for measuring a data reception time by transmitting a test signal to each slave power controller according to an embodiment of the present invention.

FIG. 4 is a block diagram illustrating a process for measuring a data reception time by transmitting a test signal to each slave power controller according to an embodiment of the present invention.

As shown in FIG. 4, the master power controller 310 may transmit the first test signal 11 to the first slave power controller 321 of the plurality of slave power controllers 321, 322, 323, and 324 at 12:00:00 and the first test signal 11 transmitted from the master power controller 310 may be received by the first slave power controller 321 at 12:00:01.

Then, the first slave power controller 321 may transmit the second test signal 12 to the second slave power controller 322 and the second test signal 12 transmitted from the first salve power controller 321 may be received by the second slave power controller 322 at 12:00:02.

Additionally, the second slave power controller 322 may transmit the third test signal 13 to the third slave power controller 323 and the third test signal 13 transmitted from the second salve power controller 322 may be received by the third slave power controller 323 at 12:00:04.

Then, the third slave power controller 323 may transmit the fourth test signal 14 to the fourth slave power controller 324 and the fourth test signal 14 transmitted from the third salve power controller 323 may be received by the fourth slave power controller 324 at 12:00:07.

Lastly, another one, that is, the fourth slave power controller 324 among the plurality of slave power controllers 321, 322, 323, and 324 may transmit, to the master power controller 310, the respective reception times ("12:00:01", "12:00:02", "12:00:04", and "12:00:07") of the test signals 11, 12, 13, and 14 received by the plurality of slave power controllers 321, 322, 323, and 324.

Then, the master power controller 310 may generate a second signal 21 for controlling each slave power controller on the basis of information on the respective reception times of the received test signals 11, 12, 13, and 14. The master power controller 310 may transmit the second signal 21 to the first slave power controller 321 and the second signal 21 may be sequentially transmitted in the order of the first slave power controller 321, the second slave power controller 322, the third slave power controller 323, and the fourth slave power controller 324. Herein, the second signal 21 may include synchronization data and control data.

Figure 5:
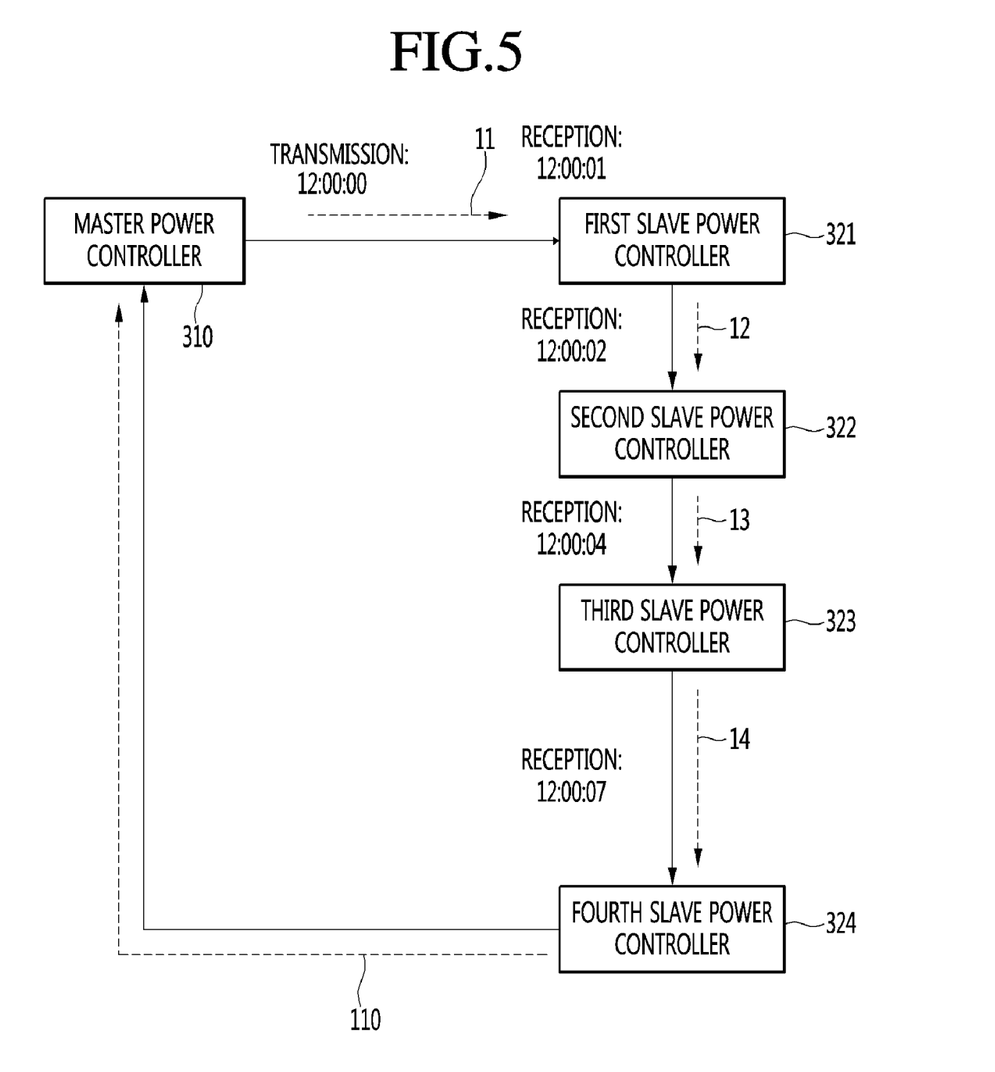
FIG. 5 is a flowchart illustrating a power controller synchronizing method according to an embodiment of the present invention.

FIG. 5 is a flowchart illustrating a power controller synchronizing method according to an embodiment of the present invention.

The master power controller 310 may transmit a first signal for measuring the data reception times of the plurality of slave power controllers 321, 322, 323, and 324 to the first slave power controller 321 that is one of the plurality of slave power controllers 321, 322, 323, and 324 in operation S101.

The plurality of slave power controllers 321, 322, 323, and 324 may measure a reception time at which a first signal is received in operation S201 and the fourth slave power controller 324 that is another one among the plurality of slave power controllers 321, 322, 323, and 324 may transmit a reception time of each of the plurality of slave power controllers 321, 322, 323, and 324 to the master power controller 310 in operation S301.

When a data signal reception time of each of the plurality of slave power controllers 321, 322, 323, and 324 is transmitted to the master power controller 310, the master power controller 310 may generate a second signal for synchronizing the plurality of slave power controllers 321, 322, 323, and 324 on the basis of each reception time information in operation S401.

The second signal generated by the master power controller 310 may include data for synchronizing time data that is necessary when the plurality of slave power controllers 321, 322, 323, and 324 controls respective battery modules. That is, the second signal generated by the master power controller 310 may include synchronization data for synchronizing a plurality of slave power controllers. The second signal generated by the master power controller 310 may further include control data for controlling each of a plurality of slave power controllers. The master power controller 310 may transmit control data for controlling each of the plurality of slave power controllers 321, 322, 323, and 324 in addition to the generated synchronization data to the plurality of slave power controllers 321, 322, 323, and 324 in operation S402.

A plurality of slave power controllers may consider synchronization data of the second signal and may be controlled according to control data of the second signal. That is, each of the plurality of slave power controllers 321, 322, 323, and 324 may transmit, to each battery module, a control command according to control data (for, example, a battery charging command) received from the master power controller 310 in correspondence to synchronization data.

Hereinafter, referring to FIG. 6, a power controller synchronization and a process for controlling a battery module according to synchronization are described in detail according to an embodiment of the present invention.

Figure 6:
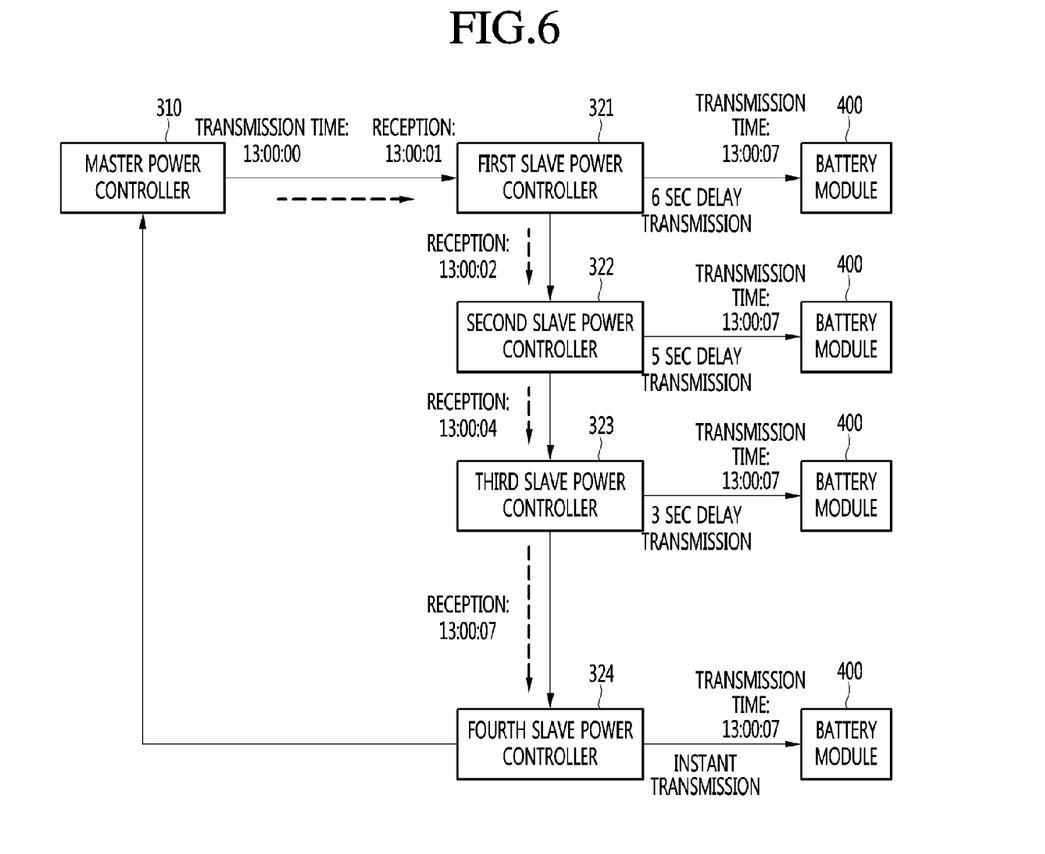
FIG. 6 is a block diagram illustrating a process for controlling each battery module on the basis of a power controller synchronizing method.

FIG. 6 is a block diagram illustrating a process for controlling each battery module on the basis of a power controller synchronizing method.

Referring to FIG. 6, the master power controller 310 may generate synchronization data on the basis of the received first signal reception timing information of each of the plurality of slave power controllers 321, 322, 323, and 324 and may transmit the generated synchronization data and individual control data (for example, a charging command of a battery in a battery module) to each of the plurality of slave power controllers 321, 322, 323, and 324 via a ring network.

In more detail, the master power controller 310 may transmit the generated synchronization data and individual control data to the first slave power controller 321 at 13:00:00.

The synchronization data and individual control data transmitted at 13:00:00 may be sequentially received by the first slave power controller 321 at 13:00:01, the second slave power controller 322 at 13:00:02, the third slave power controller 323 at 13:00:04, and the fourth slave power controller 324 at 13:00:07.

On the other hand, as soon as transmitting individual control data to each of the plurality of slave power controllers 321, 322, 323, and 324, the master power controller 310 may calculate a time at which individual control data generated after that on the basis of the first signal reception time of each of the plurality of slave power controllers 321, 322, 323, and 324 is received by each of the plurality of slave power controllers 321, 322, 323, and 324 and may generate synchronization data for performing a specific operation (for example, an operation for transmitting a battery charging command to a battery module) according to individual control data after the plurality of slave power controllers 321, 322, 323, and 324 receive respective individual control data and then, transmit the generated synchronization data together with individual control data.

As shown in FIG. 6, the master power controller 310 may generate synchronization data for allowing the first slave power controller 321, the second slave power controller 322, the third slave power controller 323, and the fourth slave power controller 324 to receive individual control data at different times (for example, 13:00:01, 13:00:02, 13:00:04, and 13:00:07) and transmit predetermined control data to each battery module simultaneously and then, may transmit the synchronization data to each of the plurality of slave power controllers 321, 322, 323, and 324.

According to an embodiment of the present invention, by synchronizing a time necessary for controlling a plurality of slave power controllers, the plurality of slave power controllers may simultaneously and stably control battery modules connected thereto.

Additionally, a time at which a first signal is delivered from a master power controller to each of a plurality of slave power controllers is measured and based on this, a second signal is transmitted to the plurality of slave power controllers. Therefore, an accurate control in consideration of a time delay of network is possible.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An energy storage system comprising:
a plurality of slave power controllers connected to respective battery modules; and
a master power controller connected to the plurality of slave power controllers through a ring network,
wherein the master power controller is configured to transmit a first signal to a first slave power controller of the plurality of slave power controllers,
each of the plurality of slave power controllers configured to, sequentially, transmit the first signal to a following slave power controller, and
a last slave power controller of the plurality of slave power controllers configured to transmit, to the master power controller, a reception time at which each of the plurality of slave power controllers receives the first signal,
wherein the master power controller is further configured to transmit a second signal for controlling synchronizations of the plurality of slave power controllers according to the reception time,
each of the plurality of slave power controllers further configured to, sequentially, transmit the received second signal to a following slave power controller,
wherein the first signal is for confirming the reception time at which each of the plurality of slave power controllers receives the first signal, and
wherein the second signal is for synchronizing and controlling the plurality of slave power controllers, generated using a difference in the reception time at which each of the plurality of slave power controllers receives the first signal.

2. The system according to claim 1, wherein the plurality of slave power controllers measure the reception time.

3. The system according to claim 2, wherein the plurality of slave power controllers deliver the reception time sequentially according to the ring network.

4. The system according to claim 1, wherein the second signal comprises synchronization data for synchronizing the plurality of slave power controllers.

5. The system according to claim 1, wherein the second signal comprises control data for controlling each of the plurality of slave power controllers.

6. The system according to claim 1, wherein the plurality of slave power controllers simultaneously control all batteries connected to the plurality of slave power controllers in response to the second signal.

7. The system according to claim 1, wherein the first signal is a test signal and the second signal comprises synchronization data for synchronizing the plurality of slave power controllers and control data for controlling each of the plurality of slave power controllers.

8. A synchronizing method of an energy storage system including a plurality of slave power controllers connected to respective battery modules and a master power controller connected to the plurality of slave power controllers through a ring network, the method comprising:
transmitting, by the master power controller, a first signal to the first slave power controller of the plurality of slave power controllers;
sequentially transmitting, by each of the plurality of slave power controllers, the first signal to a following slave power controller;
transmitting, by a last slave power controller of the plurality of slave power controllers, to the master power controller, a reception time at which each of the plurality of slave power controllers receives the first signal;
transmitting, by the master power controller, a second signal for controlling synchronizations of the plurality of slave power controllers according to the reception time; and
sequentially transmitting, by each of the plurality of slave power controllers, the received second signal to a following slave power controller,
wherein the first signal is for confirming the reception time at which each of the plurality of slave power controllers receives the first signal, and
wherein the second signal is for synchronizing and controlling the plurality of slave power controllers, generated using a difference in the reception time at which each of the plurality of slave power controllers receives the first signal.

9. The method according to claim 8, wherein the second signal comprises synchronization data for synchronizing the plurality of slave power controllers.

10. The method according to claim 9, wherein the second signal further comprises control data for controlling the plurality of slave power controllers.

11. The method according to claim 8, further comprising simultaneously controlling, by the plurality of slave power controllers, all battery modules connected to the plurality of slave power controllers in response to the second signal.

\* \* \* \* \*